United States Patent
Flessa et al.

(10) Patent No.: US 9,771,708 B2
(45) Date of Patent: Sep. 26, 2017

(54) DEVICE FOR A HOSE FITTING

(71) Applicant: Grohe AG, Hemer (DE)

(72) Inventors: Thomas Flessa, Schwarzenbach a. Wald (DE); Martin Weiss, Schwerte (DE)

(73) Assignee: Grohe AG, Hemer (DE)

( * ) Notice: Subject to any disclaimer, the term of this patent is extended or adjusted under 35 U.S.C. 154(b) by 0 days.

(21) Appl. No.: 14/201,157

(22) Filed: Mar. 7, 2014

(65) Prior Publication Data

US 2014/0252763 A1 Sep. 11, 2014

(30) Foreign Application Priority Data

Mar. 7, 2013 (DE) .................. 10 2013 003 818

(51) Int. Cl.
| | |
|---|---|
| *E03C 1/04* | (2006.01) |
| *F16L 33/207* | (2006.01) |
| *F16L 37/084* | (2006.01) |
| *F16L 33/22* | (2006.01) |

(52) U.S. Cl.
CPC ........ *E03C 1/0403* (2013.01); *F16L 33/2073* (2013.01); *F16L 33/225* (2013.01); *F16L 37/084* (2013.01)

(58) Field of Classification Search
CPC ............... F16L 33/2071; F16L 33/2073; F16L 33/2075; F16L 33/225; E03C 1/0403
See application file for complete search history.

(56) References Cited

U.S. PATENT DOCUMENTS

| | | | | |
|---|---|---|---|---|
| 3,165,338 | A * | 1/1965 | Moss ...................... | F16L 33/20 285/256 |
| 3,711,131 | A * | 1/1973 | Evans ......................... | 285/256 |
| 4,343,498 | A * | 8/1982 | Campanini .............. | 285/148.15 |
| 4,498,691 | A * | 2/1985 | Cooke .................. | F16L 33/2076 285/12 |
| 5,288,112 | A * | 2/1994 | Shiery ................. | F16L 33/2076 285/256 |
| 6,641,177 | B1 * | 11/2003 | Pinciaro ........................ | 285/242 |
| 6,846,124 | B2 * | 1/2005 | Warburton-Pitt ............. | 403/282 |
| 7,338,090 | B2 * | 3/2008 | Baldwin ................. | F16L 33/01 285/256 |
| 8,123,257 | B1 * | 2/2012 | Baer et al. .................... | 285/256 |

(Continued)

FOREIGN PATENT DOCUMENTS

| | | | | |
|---|---|---|---|---|
| DE | 19841155 | C1 * | 1/2000 | ............. F16L 47/04 |
| DE | 199 11 066 | A1 | 9/2000 | |

(Continued)

*Primary Examiner* — James M Hewitt
(74) *Attorney, Agent, or Firm* — Muncy, Geissler, Olds & Lowe, P.C.

(57) ABSTRACT

A device for a hose fitting having at least one cartridge housing with a first connecting piece or a spray plate with a second connecting piece and a hose, which can be connected at least to the first connecting piece or the second connecting piece, whereby further a clamping sleeve is provided, which clamps an end region of the hose on the outside at least to the first connecting piece or the second connecting piece and with an inward directed collar encompasses a projection of the first connecting piece or of the second connecting piece. A non-metallic, inseparable snap connection is formed with two clamping sleeves toward the cartridge housing and toward the spray plate.

9 Claims, 2 Drawing Sheets

(56) References Cited

U.S. PATENT DOCUMENTS

| | | | | |
|---|---|---|---|---|
| 8,439,405 B2* | 5/2013 | Trujillo | ............... | F16L 33/2073 |
| | | | | 285/256 |
| 2010/0025986 A1* | 2/2010 | Seton-Anderson | ........... | 285/257 |
| 2011/0272943 A1* | 11/2011 | Baldwin | ............. | F16L 33/2073 |
| | | | | 285/399 |

FOREIGN PATENT DOCUMENTS

| | | | | | |
|---|---|---|---|---|---|
| DE | 102 46 226 A1 | | 4/2004 | | |
| FR | 1249979 A | * | 1/1961 | .............. | F16L 33/01 |
| GB | 2022744 A | * | 12/1979 | .............. | F16L 33/20 |

* cited by examiner

DEVICE FOR A HOSE FITTING

This nonprovisional application claims priority under 35 U.S.C. §119(a) to German Patent Application No. 10 2013 003 818.9, which was filed in Germany on Mar. 7, 2013, and which is herein incorporated by reference.

BACKGROUND OF THE INVENTION

Field of the Invention

The present invention relates to a device for a hose fitting, particularly a fastening device for the permanent fixation of a hose to a connecting piece of a cartridge housing and/or a spray plate of said device.

Description of the Background Art

It is required particularly in regard to the provision of drinking water that the drinking water is conducted through the fitting without contact with metal. In the case of hose kits, the connection of the spray plate to the cartridge holder occurs via a flexible hose, so that connecting regions are also provided there which are currently still made with metallic connecting component. It is desirable for realizing a permanent fastening of the hose and the greatest possible ease in regard to operation and mounting that the fastening is made as small as possible, and nevertheless the necessary requirements for accommodating water pressures, temperature differences, durability, tendency for corrosion, etc., are met.

Thus far, (metallic) screw connections have been proposed, whereby in each case a thread portion is formed on the cartridge holder or on the spray plate and a thread portion on the hose and both parts are screwed together. With respect to assembly this is relatively involved and time-consuming. In addition, this type of fastening is relatively expensive.

SUMMARY OF THE INVENTION

It is therefore an object of the present invention to solve at least in part the problems described with regard to the state of the art. In particular, a device for a hose fitting is to be provided, which realizes a rapidly assemblable, inseparable connection between the hose and its connecting parts of the device.

It should be pointed out that the individually stated features can be combined in any technologically reasonable manner and demonstrate further alternative embodiments of the invention.

The device for a hose fitting comprises at least one cartridge housing with a first connecting piece or a spray plate with a second connecting piece. Furthermore, a hose is provided that can be connected at least to the first connecting piece or the second connecting piece. Further, a clamping sleeve is provided, which clamps an end region of the hose on the outside at least to the first connecting piece or the second connecting piece and with an inward directed collar encompasses a projection of the first connecting piece or the second connecting piece.

The above wording should take into account in particular that such a clamping sleeve can be provided in a first connection of the hose to the cartridge housing and/or in a second connection of the hose to the spray plate. Provided it is not specified more precisely below whether the first/second connecting piece is meant, these statements can apply analogously to both connecting pieces.

The cartridge housing normally represents the base for this device. The cartridge housing can be made as having multiple parts. It is made especially of plastic. In particular, the cartridge housing forms a first connecting piece, which limits or closes off the water conduit to the hose. In this regard, the first connecting piece is preferably formed as a single piece with the cartridge housing.

Cumulatively or alternatively, a spray plate is formed which can also be fastened to an end region of the hose. A spray plate is particularly a part that predetermines the desired form of the emerging water jet. The spray plate has also a second connecting piece to which the analogous statements made in regard to the first connecting piece basically apply.

It is preferred that in each case a single clamping sleeve is provided per connection. The clamping sleeve is designed in particular so that it can be positioned at least in sections coaxially to the connecting piece and/or to the hose. The clamping sleeve has especially an inner radius which is made (mostly) larger than the outside diameter of the hose. For this reason, it is possible in particular that the clamping sleeve can be placed around the hose on the outside or can be slipped over it, particularly if the hose comprises a deformable and/or elastic material in the cover. The clamping sleeve can be designed and assembled so that it clamps an end region of the hose from outside onto the connecting piece. The hose, therefore, is fixed particularly between an outer clamping sleeve and the connecting piece inserted inside.

The clamping sleeve further has an inward directed collar, which in the assembled state can be disposed particularly adjacent to the hose. The inward directed collar, which optionally can also be interrupted (in the circumferential direction), now encompasses a first/second projection of the first/second connecting piece. The projection of the connecting piece is dimensioned so that it also does not yield when tensile forces arise during operation. The projection is made in particular as a single piece with the connecting piece. The projection can serve, moreover, also as a stop for the hose, when it is pushed onto the connecting piece.

The collar and the projection can form a snap connection. In this regard, the collar and projection interlock particularly completely in the circumferential direction around the connecting piece. In particular, the projection forms a type of undercut which the collar must overcome when pushed onto the connecting piece. To this end, the clamping sleeve can optionally have (integrated) spring sections, which enable a widening of the collar during assembly.

The clamping sleeve and at least the first connecting piece or the second connecting piece can form an inseparable connection. This means in particular that the collar and projection are designed so that the collar does not widen on its own when the clamping sleeve is pulled back or removed from the connecting piece. For this reason, particularly the use of a special tool and/or even the destruction of the clamping sleeve are necessary when this connection is to be separated. This is to avoid damage/functional interference by the user.

Moreover, it is regarded as advantageous that the clamping sleeve forms at least one press ring internally, which presses the hose against the first connecting piece or the second connecting piece. The clamping sleeve is intended to realize in particular a secure attachment of the hose to the connecting piece, whereby water tightness also plays a major role. In order to specifically bring in pressure lines here, the clamping sleeve is preferably provided with a plurality of press rings, which represent especially a type of concavity, seal, or the like directed toward the connecting piece. It is provided for a simple construction that the press rings are produced as a single piece with the clamping sleeve. It is preferred that a single press ring is made constant (similar) in the circumferential direction, whereby it is also possible, however, that a plurality of press rings are made different from one another, particularly with respect to their axial and/or radial extension, their shape, their surface, etc. In particular, capillary formation with consideration of manufacturing tolerances of the parts mentioned here can thereby also be prevented.

It is very especially preferred in this regard that a plurality of press rings are formed on the clamping sleeve and the press ring farthest removed from the collar is positioned axially adjacent to the first connecting piece or second connecting piece. In other words, this also means that this (last) press ring in the assembled state is already positioned outside the area of the connecting piece and/or presses the hose together near an opening of the connecting piece or before the connecting piece. For example, a deformation of the hose occurs, which preferably does not significantly reduce the hydraulic diameter relative to the water conduit in the connecting piece. It is an advantage of this embodiment that the clamping sleeve can now be braced between the opening of the connecting piece and the projection, so that assembly errors can be prevented.

According to a further alternative embodiment, a water conduit through a connecting region from at least the first connecting piece or the second connecting piece toward the hose is made non-metallic. This means in particular that the water-bearing surfaces through the connecting piece and/or the hose are made without metal; therefore, for example, a water conduit surface is formed (only) with plastic. It is especially prevented in this way that intermediate pieces between the connecting piece and hose are made metallic, particularly as previously with a thread. The clamping sleeve is positioned outside and is therefore not in contact with water. The possibility exists here, nevertheless, that a metallic clamping sleeve is used; this is not absolutely necessary, however.

The invention and the technical environment will be described in greater detail below with use of the figures. In the figures, the same parts are provided with the same reference characters. It should be pointed out that the figures are schematic in nature and the invention is not limited thereto. Shown are:

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
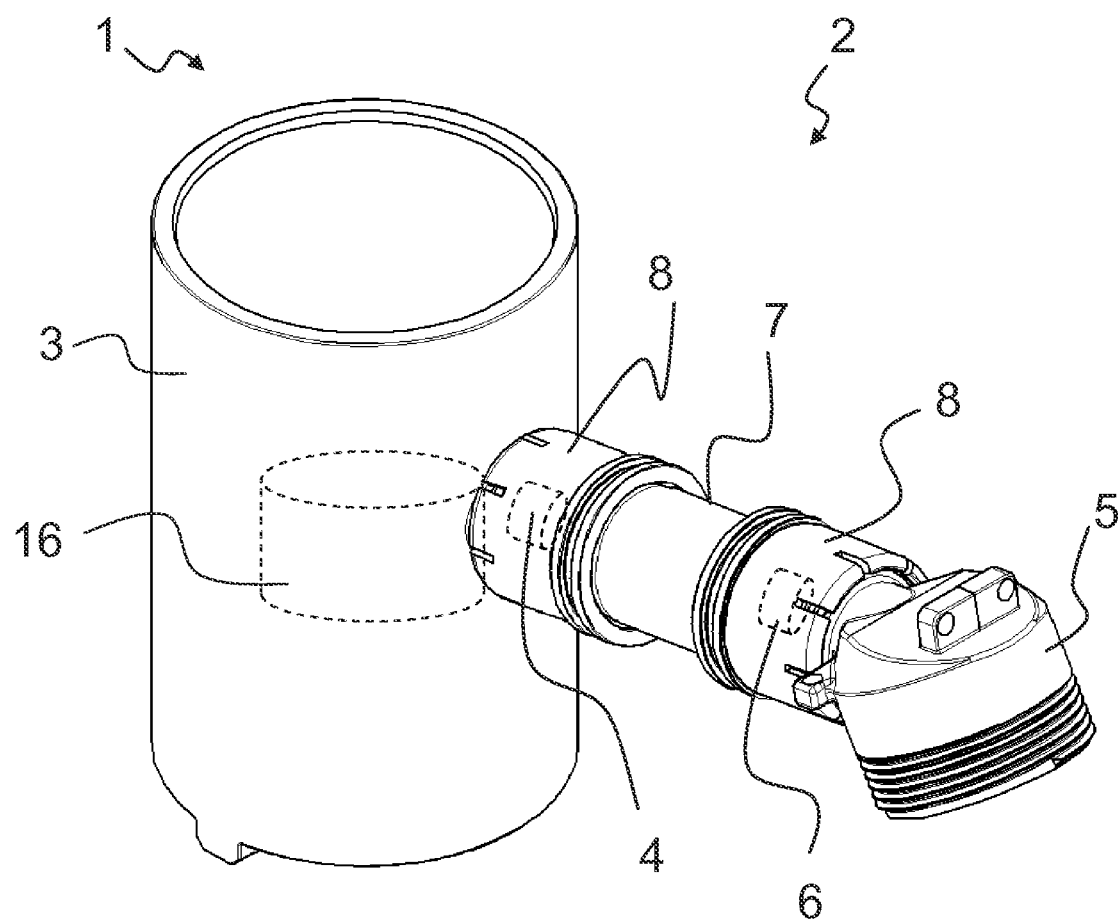
FIG. 1 is a perspective illustration of an exemplary embodiment of a device of a hose fitting.

FIG. 1 shows schematically and in a partially perspective illustration a device 1 for a hose fitting 2. Cartridge housing 3, in which cartridge 16 (indicated by dashed lines) for water preparation is placed, is shown on the left in FIG. 1. Water flows out of this cartridge housing 3 over the indicated first connecting piece 4 and hose 7 into second connecting piece 6 of the so-called spray plate 5. There, the water flows out in a desired spray pattern. It is pointed out as a precaution that the spray pattern itself is not the issue here. It is evident further from FIG. 1 that hose 7 at both end regions is fastened with a clamping sleeve 8 to the adjacent parts. These are oriented here in the opposite direction, so that in each case a first end section of the clamping sleeve is oriented toward the hose and a second end section of the clamping sleeve toward the adjacent part.

Figure 2:
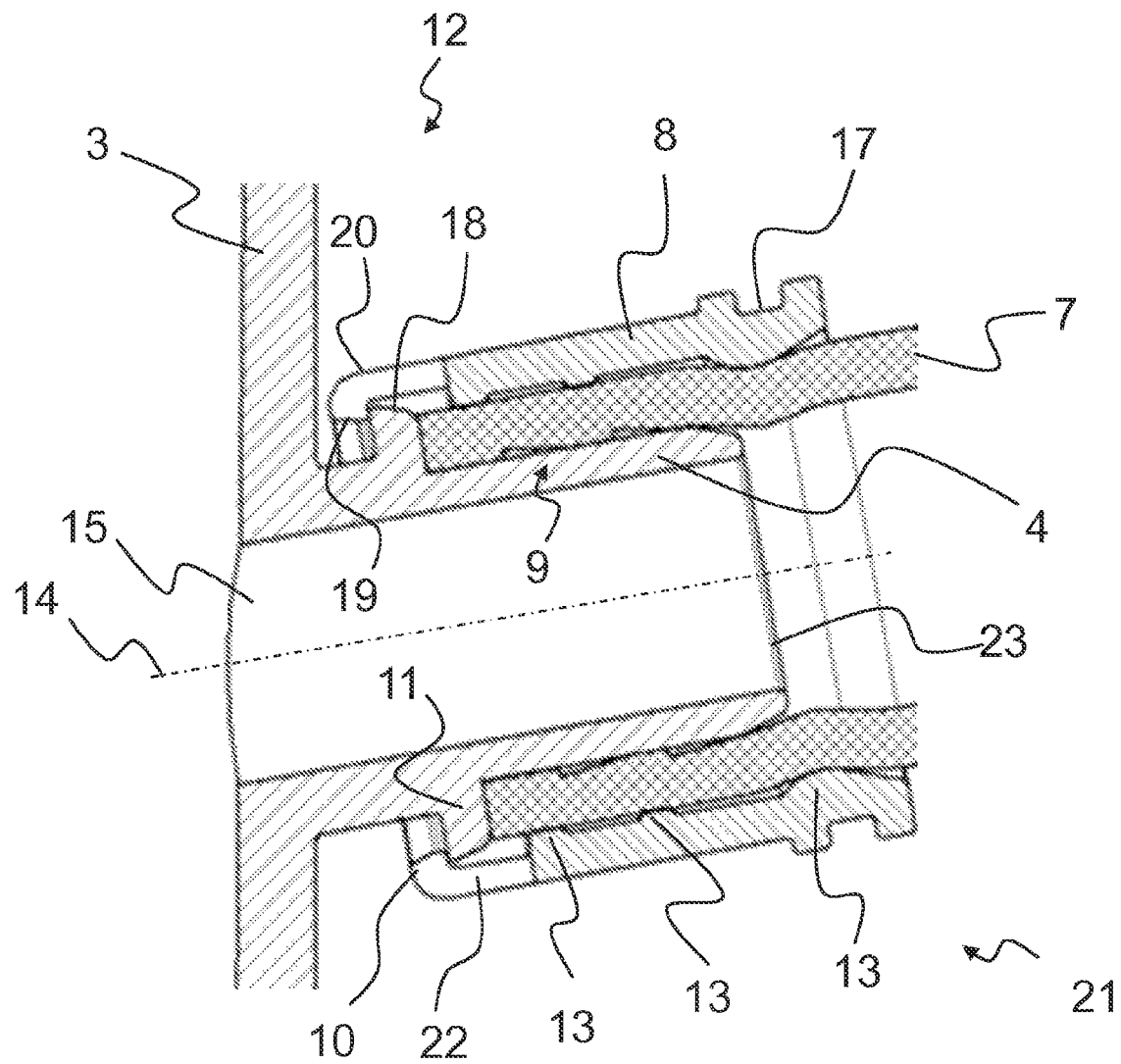
FIG. 2 is a cross-sectional view of the connecting region between the hose and cartridge housing of FIG. 1.

FIG. 2 shows a cross-sectional view of the connection between hose 7 and cartridge housing 3. The connection can and should also be made preferably similarly to the spray plate.

Shown is the first connecting piece 4, which forms a water conduit 15, whereby water can flow in along axis 14 from first connecting piece 4 into hose 7. First connecting piece 4 is preferably made from plastic. First connecting piece 4 has an opening 23. A circumferential projection 11 is formed axially spaced apart from opening 23 (therefore in the direction toward cartridge housing 3). Projection 11 extends perpendicular to axis 14 (radially) encircling first connecting piece 4. Projection 11 juts out particularly at both sides relative to the outer lateral surface of first connecting piece 4. It is provided further here that projection 11 forms a cone 18 radially outward, which thereby increases the extension of projection 11 perpendicular to axis 14 in the sliding-on direction of clamping sleeve 8, therefore from opening 23 to cartridge housing 3.

It is evident further that hose 7 with an end region 9 is put over opening 23 of first connecting piece 4, so that it extends to projection 11.

A (single) clamping sleeve 8 is provided coaxially on the outside around first connecting piece 4 and end region 9 of hose 7. Clamping sleeve 8 has a (single) inward directed collar 10. As shown here, collar 10 is interrupted, as can be seen, for example, also from slots 22 visible in FIG. 1. Between slots 22 partial areas of clamping sleeve 8 form spring sections 20 (formed as a single piece with clamping sleeve 8). This construction allows spring sections 20 or collar 10 to widen, therefore to be bent outward transverse to axis 14 (radially), when they are moved beyond projection 11. Preferably, the front sides of collar 10 are formed with a sliding surface 19, which, the on the one hand, supports a slight bending during the slipping over cone 18, but, on the other, also realizes a type of snap connection 12, when collar 10 engages behind projection 11.

An especially strong bracing of the (preferably metallic) clamping sleeve is achieved in that a plurality of inward directed press rings 13 are formed on clamping sleeve 8, whereby the farthest removed press ring 13 is positioned axially adjacent or next to first connecting piece 4, such that a radially inward-most extent of the farthest removed press ring 13 is substantially axially aligned with the distal end/opening of the first connecting piece 4. As is shown in FIG. 2, this last press ring 13 is made deeper inwards and/or broader. It can also be seen that an increased deformation of hose 7 occurs hereby, particularly in an area in front of opening 23 of first connecting piece 4. An accurately fitting bracing of clamping sleeve 8 between opening 23 and projection 11 is realized in this way. The other press rings 13, which lie between collar 10 and this last press ring, are made smaller and are used in particular for secure contact pressure and/or water tightness.

Finally, it is also shown here that a tool engaging area 17 is also provided on the outer circumferential surface of clamping sleeve 8, which can be used for assembly purposes.

The invention thereby solves the aforementioned problems and provides in particular a device for a hose fitting, whereby two clamping sleeves form a non-metallic, inseparable snap connection toward the cartridge housing and toward the spray plate.

As a precaution, it should also be pointed out that the combinations of technical features as shown in the figures are not obligatory in general. This means that the technical features of a figure can be combined with other technical features of another figure and/or the general description. Something different should apply only if the combination of features was shown explicitly here and/or the person skilled in the art realizes that otherwise the basic functions of the device can no longer be fulfilled.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A water cartridge housing assembly, comprising:
   at least one cartridge housing with a first connecting piece or a spray plate with a second connecting piece and a hose, which is connected at least to the first connecting piece or the second connecting piece;
   a clamping sleeve, which clamps an end region of the hose on an outside at least to the first connecting piece or the second connecting piece; and
   the clamping sleeve having an inward directed collar that encompasses a projection of the first connecting piece or of the second connecting piece,
   wherein press rings are formed to project from a same, level internal surface of the clamping sleeve to press the hose against the first connecting piece or the second connecting piece, and
   wherein, in a fully assembled state of the clamping sleeve on the first connecting piece or on the second connecting piece, the radially inward-most extent of the press ring farthest removed from the inward directed collar is substantially axially aligned with a distal end of the first connecting piece or the second connecting piece in a radial direction and projects radially inward to a greater extent than all other press rings projecting from the internal surface of the clamping sleeve.

2. The water cartridge housing assembly according to claim 1, wherein the collar and the projection form a snap connection.

3. The water cartridge housing assembly according to claim 1, wherein the clamping sleeve and at least the first connecting piece or the second connecting piece form an inseparable connection.

4. The water cartridge housing assembly according to claim 1, wherein the inward directed collar is provided with a plurality of slots along a circumference thereof.

5. The water cartridge housing assembly according to claim 1, wherein a distal end of the hose abuts against a side surface of the projection of the first connecting piece or the second connecting piece.

6. The water cartridge housing assembly according to claim 1, wherein a water cartridge is provided inside of the at least one cartridge housing.

7. The water cartridge housing assembly according to claim 1, wherein each of the press rings are separated from one another in an axial direction of the clamping sleeve by portions of the same, level internal surface of the clamping sleeve.

8. A device for a hose fitting comprising:
   at least one cartridge housing with a first connecting piece or a spray plate with a second connecting piece;
   a hose connected at least to the first connecting piece or the second connecting piece;
   a clamping sleeve, which clamps an end region of the hose to an outside of the first connecting piece or the second connecting piece,
   wherein the clamping sleeve has an inward directed collar that encompasses a projection of the first connecting piece or a projection of the second connecting piece,
   wherein the clamping sleeve has press rings that are formed to project from a same, level internal surface of the clamping sleeve to press the hose against the first connecting piece or the second connecting piece, and
   wherein, in a fully assembled state of the clamping sleeve on the first connecting piece or on the second connecting piece, the radially inward-most extent of the press ring farthest removed from the inward directed collar is substantially axially aligned with an opening of the first connecting piece or the second connecting piece in a radial direction and projects radially inward to a greater extent than all other press rings of the clamping ring.

9. The device according to claim 8, wherein each of the press rings are separated from one another in an axial direction of the clamping sleeve by portions of the same, level internal surface of the clamping sleeve.

* * * * *